(12) United States Patent
Kingrey et al.

(10) Patent No.: US 8,692,432 B2
(45) Date of Patent: Apr. 8, 2014

(54) PERMANENT MAGNET ROTORS AND METHODS OF ASSEMBLING THE SAME

(75) Inventors: Harold C. Kingrey, Huntington, IN (US); John R. Oakes, Markle, IN (US); Daniel S. Figgins, Fort Wayne, IN (US); Jeffrey A. Hall, Fort Wayne, IN (US); Subhash M. Brahmavar, Fort Wayne, IN (US); Donald E. Bair, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 42 days.

(21) Appl. No.: 12/962,134

(22) Filed: Dec. 7, 2010

(65) Prior Publication Data
US 2012/0139381 A1 Jun. 7, 2012

(51) Int. Cl.
*H02K 1/27* (2006.01)
*H02K 1/28* (2006.01)

(52) U.S. Cl.
USPC ............................. 310/156.53; 310/216.016

(58) Field of Classification Search
CPC ........................................... H02K 1/276
USPC ............. 310/156.53, 156.56, 216.119, 261.1, 310/216.015–216.016
See application file for complete search history.

(56) References Cited

U.S. PATENT DOCUMENTS

| | | | | |
|---|---|---|---|---|
| 4,214,921 A | * | 7/1980 | Henderson | 148/246 |
| 4,486,679 A | * | 12/1984 | Jones | 310/407 |
| 5,223,775 A | | 6/1993 | Mongeau | |
| 5,258,678 A | * | 11/1993 | Futami | 310/156.53 |
| 5,321,575 A | | 6/1994 | Shilo | |
| 5,444,341 A | | 8/1995 | Kneifel, II et al. | |
| 5,555,150 A | | 9/1996 | Newman, Jr. | |
| 5,592,058 A | | 1/1997 | Archer et al. | |
| 5,650,680 A | | 7/1997 | Chula | |
| 5,811,904 A | | 9/1998 | Tajima et al. | |
| 6,034,460 A | | 3/2000 | Tajima et al. | |

(Continued)

FOREIGN PATENT DOCUMENTS

| | | | | |
|---|---|---|---|---|
| DE | 102006056873 | * | 6/2008 | H02K 1/27 |
| DE | 102008043138 | * | 4/2010 | H02K 1/27 |

(Continued)

OTHER PUBLICATIONS

Kuwabara, JP2004364349A Machine Translation, Dec. 2004.*

(Continued)

*Primary Examiner* — Burton Mullins
*Assistant Examiner* — Eric Johnson
(74) *Attorney, Agent, or Firm* — Armstrong Teasdale LLP (57) ABSTRACT

A method for securing a permanent magnet within a rotor core is described. The rotor core includes a first end and a second end and at least one permanent magnet opening configured to receive the permanent magnet. The method includes coupling a first rotor end lamination to the first end of the rotor core. The first lamination includes at least one inner wall that defines an opening within the first lamination that corresponds to the permanent magnet opening in the rotor core. The first lamination includes a bridge portion positioned between the at least one inner wall and an outer edge of the first rotor end lamination. The method also includes positioning a permanent magnet at least partially within the permanent magnet opening and mechanically deforming the bridge portion of the first lamination to secure the permanent magnet within the permanent magnet opening.

8 Claims, 7 Drawing Sheets

(56) References Cited

U.S. PATENT DOCUMENTS

| | | |
|---|---|---|
| 6,188,157 B1 | 2/2001 | Tajima et al. |
| 6,208,054 B1 | 3/2001 | Tajima et al. |
| 6,326,750 B1 | 12/2001 | Marcinkiewicz |
| 6,348,752 B1 | 2/2002 | Erdman et al. |
| 6,396,183 B1 | 5/2002 | Tajima et al. |
| 6,396,229 B1 | 5/2002 | Sakamoto et al. |
| 6,423,118 B1 | 7/2002 | Becerra et al. |
| 6,445,100 B2 | 9/2002 | Tajima et al. |
| 6,628,099 B2 | 9/2003 | Iwaji et al. |
| 6,650,081 B2 | 11/2003 | Iwaji et al. |
| 6,717,314 B2 | 4/2004 | Horst et al. |
| 6,734,592 B2 | 5/2004 | Tajima et al. |
| 6,794,784 B2 | 9/2004 | Takahashi et al. |
| 6,798,103 B2 | 9/2004 | Tajima et al. |
| 6,800,979 B2 | 10/2004 | Kato et al. |
| 6,822,360 B2 | 11/2004 | Tajima et al. |
| 6,876,117 B2 | 4/2005 | Tajima et al. |
| 6,949,856 B2 | 9/2005 | Tajima et al. |
| 7,119,470 B2 | 10/2006 | Tajima et al. |
| 7,183,686 B2 | 2/2007 | Sasaki et al. |
| 7,196,447 B2 | 3/2007 | Tajima et al. |
| 7,312,970 B2 | 12/2007 | Skinner |
| 7,342,379 B2 | 3/2008 | Marcinkiewicz |
| 7,378,773 B2 | 5/2008 | Tajima et al. |
| 7,626,349 B2 | 12/2009 | Marcinkiewicz et al. |
| 7,646,125 B2 * | 1/2010 | Okamoto et al. ........ 310/156.53 |
| 2005/0152085 A1 | 7/2005 | Skinner |
| 2005/0231880 A1 | 10/2005 | Sunaga et al. |
| 2010/0141074 A1 * | 6/2010 | Podack ..................... 310/156.08 |
| 2011/0291514 A1 * | 12/2011 | Figgins et al. ........... 310/156.12 |

FOREIGN PATENT DOCUMENTS

| | | | | |
|---|---|---|---|---|
| JP | 05056583 A | * | 3/1993 | ............... H02K 1/27 |
| JP | 11355985 A | * | 12/1999 | ............... H02K 1/27 |
| JP | 2001157395 A | * | 6/2001 | ............... H02K 1/27 |
| JP | 2001258187 A | * | 9/2001 | ............... H02K 1/27 |
| JP | 2003134705 A | * | 5/2003 | ............... H02K 1/27 |
| JP | 2004364349 A | * | 12/2004 | ............... H02K 1/27 |

OTHER PUBLICATIONS

Nagate et al, JP05056583A Machine Translation, Mar. 1993.*
Shimomura et al., JP11355985A Machine Translation, Dec. 1999.*
Motsubara et al., JP2001258187A Machine Translation, Sep. 2001.*
Office Action from the Mexican Institute of Industrial Property, dated Jun. 20, 2013, for co-pending MX patent application No. MX/A/2011/013090.
English language translation of a Mexican Office Action, dated Oct. 9, 2013, for co-pending Mexican Patent Application No. MX/A/2011/013090 (3 pgs).

* cited by examiner

PERMANENT MAGNET ROTORS AND METHODS OF ASSEMBLING THE SAME

BACKGROUND OF THE INVENTION

The field of the invention relates generally to electric machines, and more specifically, to an interior permanent magnet rotor for use in an electric machine and methods of assembling the same.

Various types of electric machines include permanent magnets. For example, a direct current (DC) motor may include a plurality of permanent magnets coupled to an exterior surface of a rotor core. Typically, the plurality of permanent magnets are coupled to the exterior surface of the rotor core using an adhesive and/or a retaining ring. The plurality of permanent magnets must be coupled to the rotor core such that the permanent magnets remain coupled to the rotor core even when high speed rotation of the rotor exerts forces on the permanent magnets tending to separate the permanent magnets from the rotor core.

Permanent magnets may also be positioned within a rotor core. Such a rotor may be referred to as an interior permanent magnet rotor. Typically, magnets have been retained within the rotor core by riveting end laminations without openings to the rotor core. End laminations may also be coupled to the rotor core, after the permanent magnets are positioned within the rotor core, by welding, staking, or adhesives.

BRIEF DESCRIPTION OF THE INVENTION

In one aspect, a method for securing a permanent magnet within a rotor core is provided. The rotor core includes a first end, a second end, and at least one permanent magnet opening configured to receive a permanent magnet. The method includes coupling a first rotor end lamination to the first end of the rotor core. The first lamination includes at least one inner wall that defines an opening within the first rotor end lamination that corresponds to the at least one permanent magnet opening in the rotor core. The first rotor end lamination also includes a bridge portion positioned between the at least one inner wall and an outer edge of the first rotor end lamination. The method also includes positioning a permanent magnet at least partially within the at least one permanent magnet opening and mechanically deforming the bridge portion of the first rotor end lamination to secure the permanent magnet within the at least one permanent magnet opening.

In another aspect, a permanent magnet rotor is provided. The permanent magnet rotor includes at least one permanent magnet and a rotor core including a first end and a second end. The rotor core includes at least one inner wall that defines a permanent magnet opening configured to receive the at least one permanent magnet. The permanent magnet rotor also includes a first rotor end lamination coupled to the first end of the rotor core. The first rotor end lamination includes at least one inner wall defining an opening corresponding to the permanent magnet opening included within the rotor core. The first rotor end lamination further includes at least one permanent magnet retention feature configured to secure the at least one permanent magnet within the rotor core. The permanent magnet rotor also includes a second rotor end lamination coupled to the second end of the rotor core. The second rotor end lamination includes at least one inner wall defining an opening corresponding to the permanent magnet opening included within the rotor core. The second rotor end lamination further includes at least one permanent magnet retention feature configured to secure the at least one permanent magnet within the rotor core.

In yet another aspect, an electric machine is provided. The electric machine includes a machine housing, a stator disposed at least partially within the machine housing, and a rotor disposed at least partially within the machine housing. The rotor is configured to rotate with respect to the stator. The rotor includes at least one permanent magnet and a rotor core including a first end, a second end, and at least one inner wall defining a permanent magnet opening configured to receive the at least one permanent magnet. The rotor also includes a first rotor end lamination coupled to the first end of the rotor core. The first rotor end lamination includes at least one inner wall defining an opening that corresponds to the permanent magnet opening included within the rotor core. The first rotor end lamination further includes at least one permanent magnet retention feature configured to secure the at least one permanent magnet within the rotor core. The rotor also includes a second rotor end lamination coupled to the second end of the rotor core. The second rotor end lamination includes at least one inner wall defining an opening corresponding to the permanent magnet opening included within the rotor core. The second rotor end lamination further includes at least one permanent magnet retention feature configured to secure the at least one permanent magnet within the rotor core.

DETAILED DESCRIPTION OF THE INVENTION

The methods, systems, and apparatus described herein facilitate efficient and economical manufacturing of an electric machine. Although described herein as associated with an electric motor, the methods, systems, and apparatus described herein may also be associated with an electric generator. As described herein, a first rotor end lamination and a second rotor end lamination include at least one permanent magnet retention feature configured to secure a permanent magnet within a rotor core. The permanent magnet retention feature may include a magnet retention tab and/or a deformable bridge.

Figure 1:
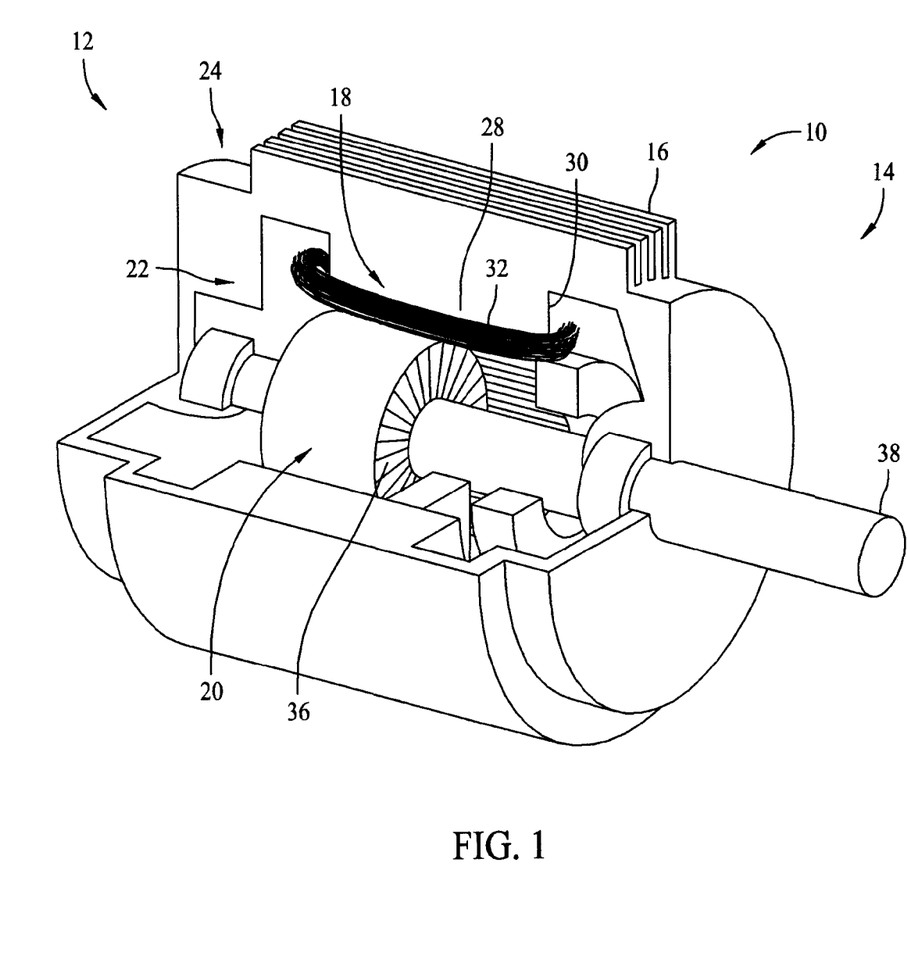
FIG. 1 is a perspective cut-away view of an exemplary embodiment of an electric motor.

FIG. 1 is a perspective cut-away view of an exemplary electric motor 10. Although referred to herein as electric motor 10, electric motor 10 can be operated as either a generator or a motor. Electric motor 10 includes a first end 12 and a second end 14. Electric motor 10 includes a motor assembly housing 16. Electric motor 10 also includes a stationary assembly 18 and a rotatable assembly 20. Motor assembly housing 16 defines an interior 22 and an exterior 24 of motor 10 and is configured to at least partially enclose and protect stationary assembly 18 and rotatable assembly 20. Stationary assembly 18 includes a stator core 28, which includes a plurality of stator teeth 30 and a plurality of windings 32 wound around stator teeth 30. In an exemplary embodiment, stationary assembly 18 is a single phase salient pole stator assembly, stator core 28 is formed from a stack of laminations made of a highly magnetically permeable material, and windings 32 are wound on stator core 28 in a manner known to those of ordinary skill in the art.

Rotatable assembly 20 includes a permanent magnet rotor core 36 and a shaft 38. In the exemplary embodiment, rotor core 36 is formed from a stack of laminations made of a magnetically permeable material and is substantially received in a central bore of stator core 28. Rotor core 36 and stator core 28 are illustrated as being solid in FIG. 1 for simplicity, their construction being well known to those of ordinary skill in the art. While FIG. 1 is an illustration of a three phase electric motor, the methods and apparatus described herein may be included within motors having any number of phases, including single phase and multiple phase electric motors.

In the exemplary embodiment, electric motor 10 is coupled to a fan (not shown) for moving air through an air handling system, for blowing air over cooling coils, and/or for driving a compressor within an air conditioning/refrigeration system. More specifically, motor 10 may be used in air moving applications used in the heating, ventilation, and air conditioning (HVAC) industry, for example, in residential applications using ⅓ hp to 1 hp motors and/or in commercial and industrial applications and hermetic compressor motors used in air conditioning applications. Although described herein in the context of an air handling system, electric motor 10 may engage any suitable work component and be configured to drive such a work component.

Figure 2:
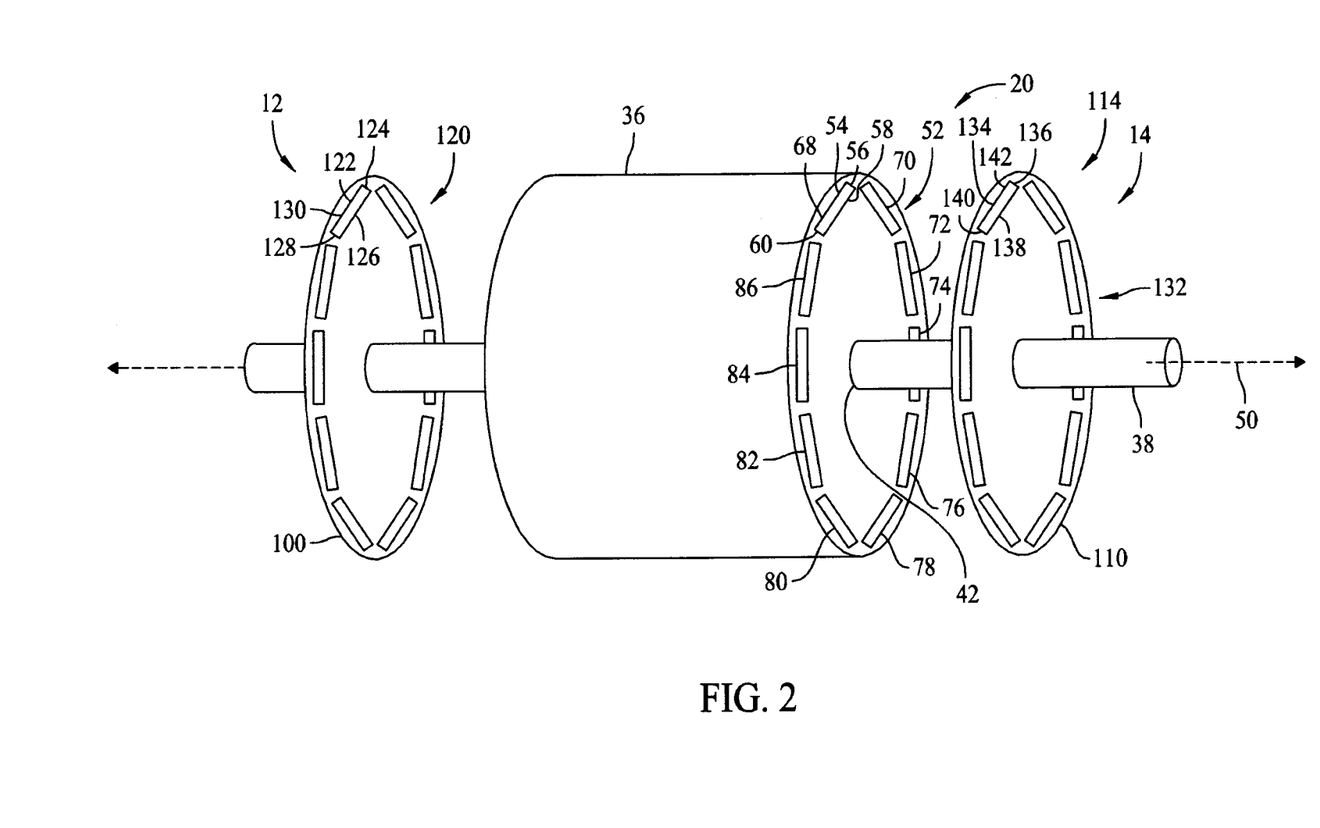
FIG. 2 is a perspective view of an exemplary embodiment of a rotatable assembly that may be included within the electric motor shown in FIG. 1.

FIG. 2 is a perspective view of an exemplary embodiment of rotatable assembly 20 that may be included within electric motor 10 (shown in FIG. 1). In the exemplary embodiment, rotatable assembly 20 includes rotor core 36 and shaft 38. Rotor core 36 includes a shaft opening 42 having a diameter corresponding to a diameter of shaft 38. Rotor core 36 and shaft 38 are concentric and configured to rotate about an axis of rotation 50. In the exemplary embodiment, rotor core 36 includes a plurality of laminations, either interlocked or loose laminations. In an alternative embodiment, rotor core 36 is a solid core. For example, rotor core 36 may be formed using a sintering process from a soft magnetic composite (SMC) material, a soft magnetic alloy (SMA) material, and/or a powdered ferrite material Rotor core 36 further includes a plurality of inner walls that define a plurality of permanent magnet openings 52. For example, a first inner wall 54, a second inner wall 56, a third inner wall 58, and a fourth inner wall 60 define a first permanent magnet opening 68 of the plurality of permanent magnet openings 52. In the exemplary embodiment, the plurality of permanent magnet openings 52 further includes a second permanent magnet opening 70, a third permanent magnet opening 72, a fourth permanent magnet opening 74, a fifth permanent magnet opening 76, a sixth permanent magnet opening 78, a seventh permanent magnet opening 80, an eighth permanent magnet opening 82, a ninth permanent magnet opening 84, and a tenth permanent magnet opening 86. The plurality of permanent magnet openings 52 extend from first end 12, through rotor core 36, to second end 14. Each of the plurality of permanent magnet openings 52 is configured to receive a permanent magnet (shown in FIG. 6). The permanent magnet extends at least partially from first end 12 to second end 14 of rotor core 36. Adjacent permanent magnets within the plurality of openings 52 are oppositely polarized. Although described as including ten permanent magnet openings, rotor core 36 may include any number of permanent magnet openings that allows electric motor 10 to function as described herein. Examples of motors that may include interior permanent magnet rotors include, but are not limited to, electronically commutated motors (ECMs). ECMs may include, but are not limited to, brushless direct current (BLDC) motors, brushless alternating current (BLAC) motors, and variable reluctance motors.

In the exemplary embodiment, rotatable assembly 20 further includes at least one rotor end lamination, for example, a first rotor end lamination 100 and a second rotor end lamination 110. In the exemplary embodiment, first rotor end lamination 100 is coupled to first end 12 of rotor core 36. Furthermore, first rotor end lamination 100 includes a plurality of inner walls that define a plurality of openings 120 within first rotor end lamination 100. For example, a first inner wall 122, a second inner wall 124, a third inner wall 126, and a fourth inner wall 128 define a first opening 130 within first rotor end lamination 100. First opening 130 corresponds to one of the plurality of permanent magnet openings 52 within rotor core 36, for example, first permanent magnet opening 68. In the exemplary embodiment, first opening 130 is substantially similar in shape and size to first permanent magnet opening 68 and is configured to align with first permanent magnet opening 68. First opening 130 may include any shape and size that allows first rotor end lamination 100 to function as described herein.

In the exemplary embodiment, second rotor end lamination 110 is coupled to second end 14 of rotor core 36. Furthermore, second rotor end lamination 110 includes a plurality of inner walls that define a plurality of openings 132 within second rotor end lamination 110. For example, a first inner wall 134, a second inner wall 136, a third inner wall 138, and a fourth inner wall 140 define a first opening 142 within second rotor end lamination 110. First opening 142 corresponds to one of the plurality of permanent magnet openings 52 within rotor core 36, for example, first permanent magnet opening 68. In the exemplary embodiment, first opening 142 is substantially similar in shape and size to first permanent magnet opening 68 and is configured to align with first permanent magnet opening 68. First opening 142 may include any shape and size that allows second rotor end lamination 110 to function as described herein.

Figure 3:
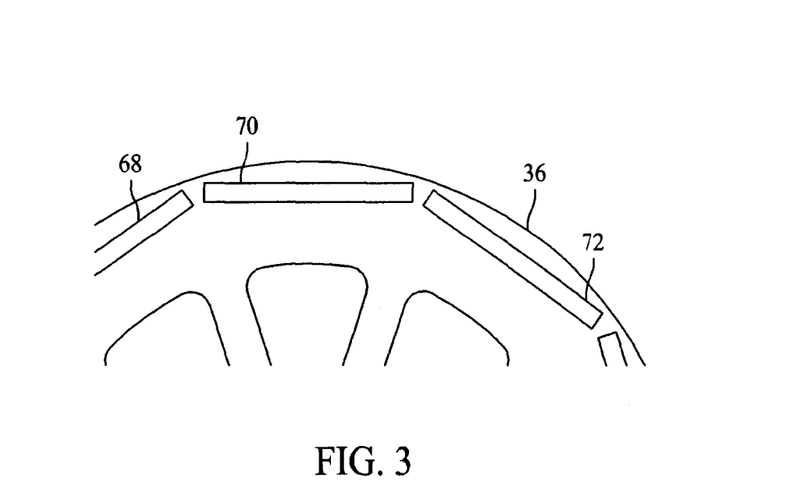
FIG. 3 is a top view of a portion of a rotor core that may be included within the rotatable assembly shown in FIG. 2.

FIG. 3 is a top view of a portion of first end 12 of rotor core 36. As described above, in the exemplary embodiment, rotor core 36 includes first opening 68, second opening 70, and third opening 72. In the exemplary embodiment, openings 68, 70, and 72 are generally rectangular openings. Although described as rectangular, openings 68, 70, and 72 may be any suitable shape, corresponding to the shape of the permanent magnets, that allows rotatable assembly 20 to function as described herein.

Figure 4:
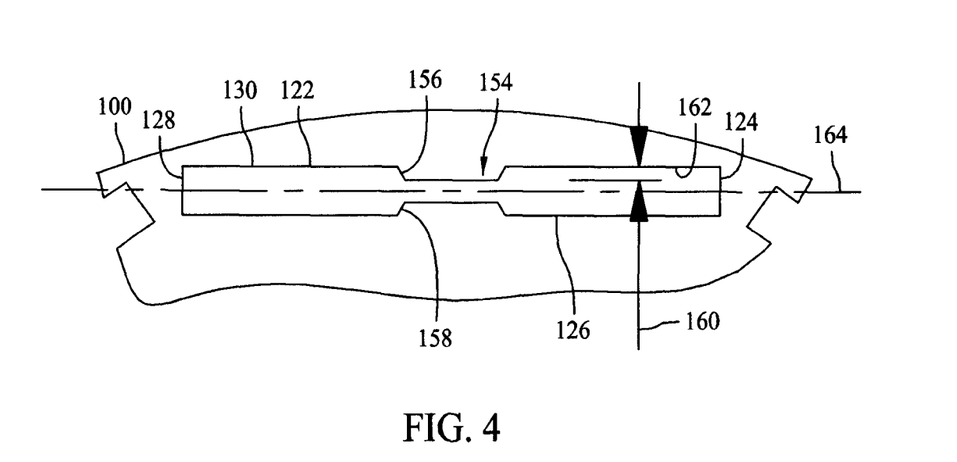
FIG. 4 is a top view of a portion of an exemplary embodiment of a rotor end lamination that may be included within the rotatable assembly shown in FIG. 2.

FIG. 4 is a top view of a portion of an exemplary embodiment of first rotor end lamination 100. As described above, first rotor end lamination 100 includes plurality of openings 120 that correspond to the plurality of permanent magnet openings 52 within rotor core 36. The plurality of openings 120 within first rotor end lamination 100 includes first opening 130, defined by first inner wall 122, second inner wall 124, third inner wall 126, and fourth inner wall 128. When first rotor end lamination 100 is coupled to first end 12 of rotor core 36, first opening 130 aligns with first opening 68 of the plurality of permanent magnet openings 52 within rotor core 36. In the exemplary embodiment, first rotor end lamination 100 includes a first permanent magnet retention feature 154. First permanent magnet retention feature 154 may include, but is not limited to, a projection, a protruding member, and/or a tab extending into opening 130 and configured to secure a permanent magnet within first permanent magnet opening 68. In the exemplary embodiment, first permanent magnet retention feature 154 includes a first tab 156 and a second tab 158. First tab 156 radially extends a distance 160 from first inner wall 122 and second tab 158 radially extend distance 160 from third inner wall 126 toward a center 164 of first opening 130. When first rotor end lamination 100 is coupled to first end 12 of rotor core 36, and a permanent magnet is positioned within first permanent magnet opening 68 of rotor core 36, first tab 156 and second tab 158 facilitate securing the permanent magnet within rotor core 36. Although described as including first tab 156 and second tab 158, first rotor end lamination 100 may include one tab, more than two tabs, or any other number of tabs that allows rotatable assembly 20 to function as described herein. Furthermore, distance 160 may be the same, or different, for each of first tab 156 and second tab 158. Moreover, although described with respect to first rotor end lamination 100, magnet retention feature 154 may also be included within second rotor end lamination 110 (shown in FIG. 2).

Figure 5:
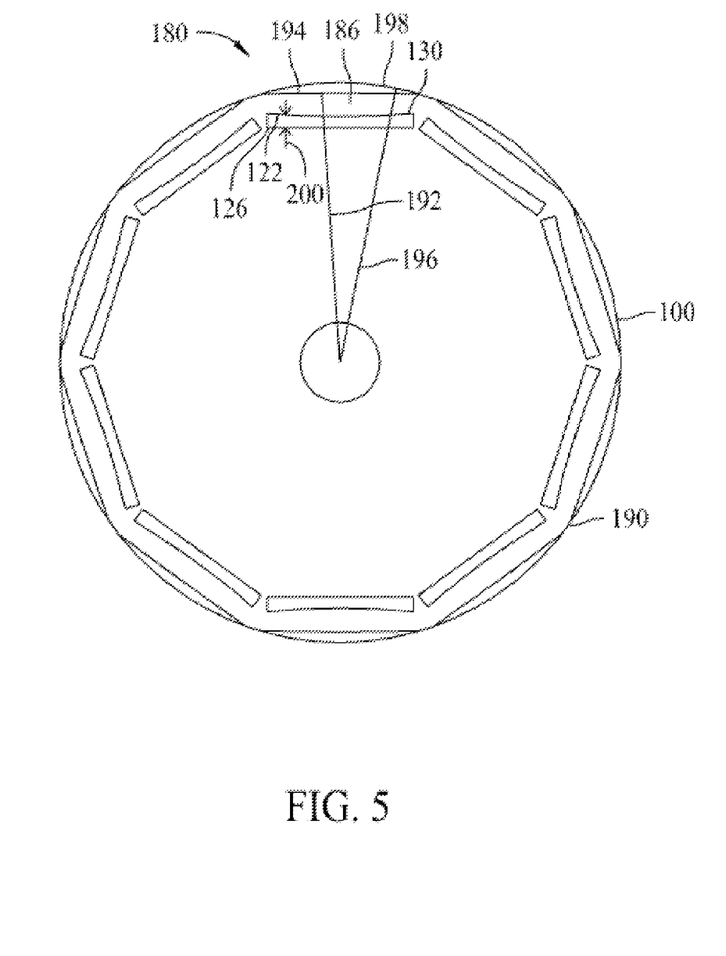
FIG. 5 is a top view of a portion of an alternative embodiment of a rotor end lamination that may be included within the rotatable assembly shown in FIG. 2.

FIG. 5 is a top view of an alternative embodiment of first rotor end lamination 100. As described above, first rotor end lamination 100 includes plurality of openings 120 that correspond to the plurality of permanent magnet openings 52 within rotor core 36. The plurality of openings 120 includes first opening 130. When first rotor end lamination 100 is coupled to first end 12 of rotor core 36, first opening 130 aligns with first opening 68 of the plurality of permanent magnet openings 52. First opening 130 allows a permanent magnet to pass through first rotor end lamination 100 and into first opening 68 within rotor core 36. In the alternative embodiment, first rotor end lamination 100 includes a second permanent magnet retention feature 180. In the alternative embodiment, second permanent magnet retention feature 180 includes a deformable bridge 186. In the exemplary embodiment, deformable bridge 186 is included within first rotor end lamination 100. Deformable bridge 186 is a portion of first rotor end lamination 100 between first inner wall 122 and an outer edge 190 of first rotor end lamination 100. Deformable bridge 186 is configured to be mechanically deformed in order to secure the permanent magnet within first permanent magnet opening 68.

In the alternative embodiment, pressure is applied to deformable bridge 186 in a radial direction, toward axis of rotation 50 (shown in FIG. 1). The applied pressure causes a reduction in a radius 192 between axis of rotation 50 and an outer edge 194 of bridge 186 when compared to a radius 196 between axis of rotation 50 and an outer edge 198 of rotor core 36. The applied pressure also causes a reduction in a distance 200 between first inner wall 122 of first opening 130 and third inner wall 126 of first opening 130. More specifically, the applied pressure moves first inner wall 122 closer to third inner wall 126. The applied pressure causes first inner wall 122 to transform from a substantially straight edge, to a curved edge. Once deformed, deformable bridge 186 secures the permanent magnet within first permanent magnet opening 68 of rotor core 36. Moreover, although described with respect to first rotor end lamination 100, magnet retention feature 180 may also be included within second rotor end lamination 110 (shown in FIG. 2).

Figure 6:
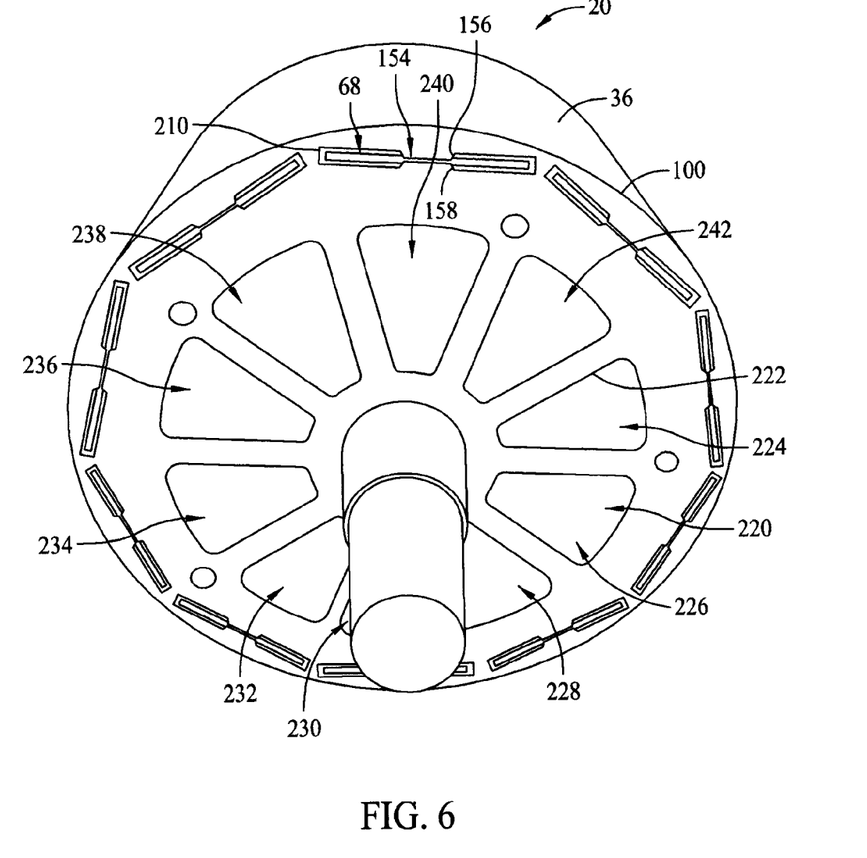
FIG. 6 is a perspective view of the rotatable assembly shown in FIGS. 1 and 2, including the rotor end lamination shown in FIG. 4.

FIG. 6 is a perspective view of an exemplary embodiment of rotatable assembly 20 (shown in FIGS. 1 and 2). In the exemplary embodiment, first rotor end lamination 100 includes first permanent magnet retention feature 154. More specifically, first rotor end lamination 100 is coupled to rotor core 36. Tabs 156 and 158 within first rotor end lamination 100 secure a permanent magnet 210 within permanent magnet opening 68 of rotor core 36. In the exemplary embodiment, rotatable assembly 20 also includes a plurality of inner rotor walls that define a plurality of rotor core openings 220. For example, a first inner rotor wall 222 defines a first rotor core opening 224. In the exemplary embodiment, the plurality of rotor core openings 220 further includes a second rotor core opening 226, a third rotor core opening 228, a fourth rotor core opening 230, a fifth rotor core opening 232, a sixth rotor core opening 234, a seventh rotor core opening 236, an eighth rotor core opening 238, a ninth rotor core opening 240, and a tenth rotor core opening 242. Although described as including ten rotor core openings, rotatable assembly 20 may include any number of rotor core openings that allow rotatable assembly 20 to function as described herein. The plurality of rotor core openings 220 extend through first rotor end lamination 100, rotor core 36 and, if included in rotatable assembly 20, through second rotor end lamination 110. The plurality of rotor core openings 220 facilitate efficient preheating of rotor core 36 prior to coating and to optimize a natural frequency of rotor core 36.

Figure 7:
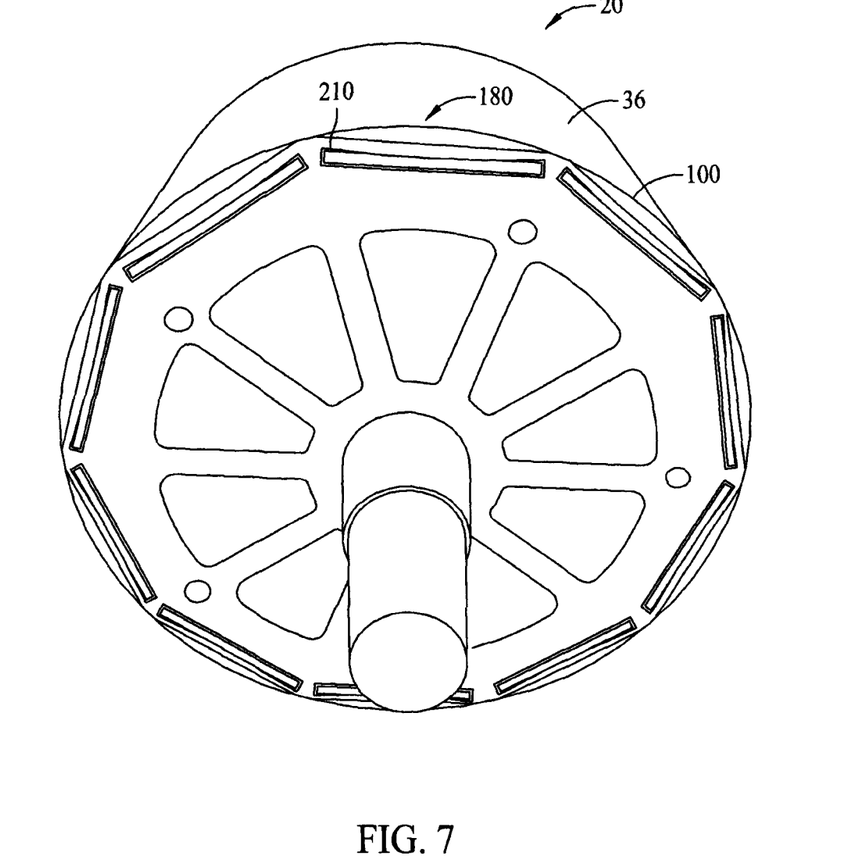
FIG. 7 is a perspective view of the rotatable assembly shown in FIGS. 1 and 2, including the rotor end lamination shown in FIG. 5.

FIG. 7 is a perspective view of an alternative embodiment of rotatable assembly 20 (shown in FIGS. 1 and 2). In the alternative embodiment, first rotor end lamination 100 includes second permanent magnet retention feature 180. More specifically, first rotor end lamination 100 is coupled to rotor core 36. Pressure has been mechanically applied to deform deformable bridge 186, which secures permanent magnet 210 within permanent magnet opening 68 of rotor core 36.

Figure 8:
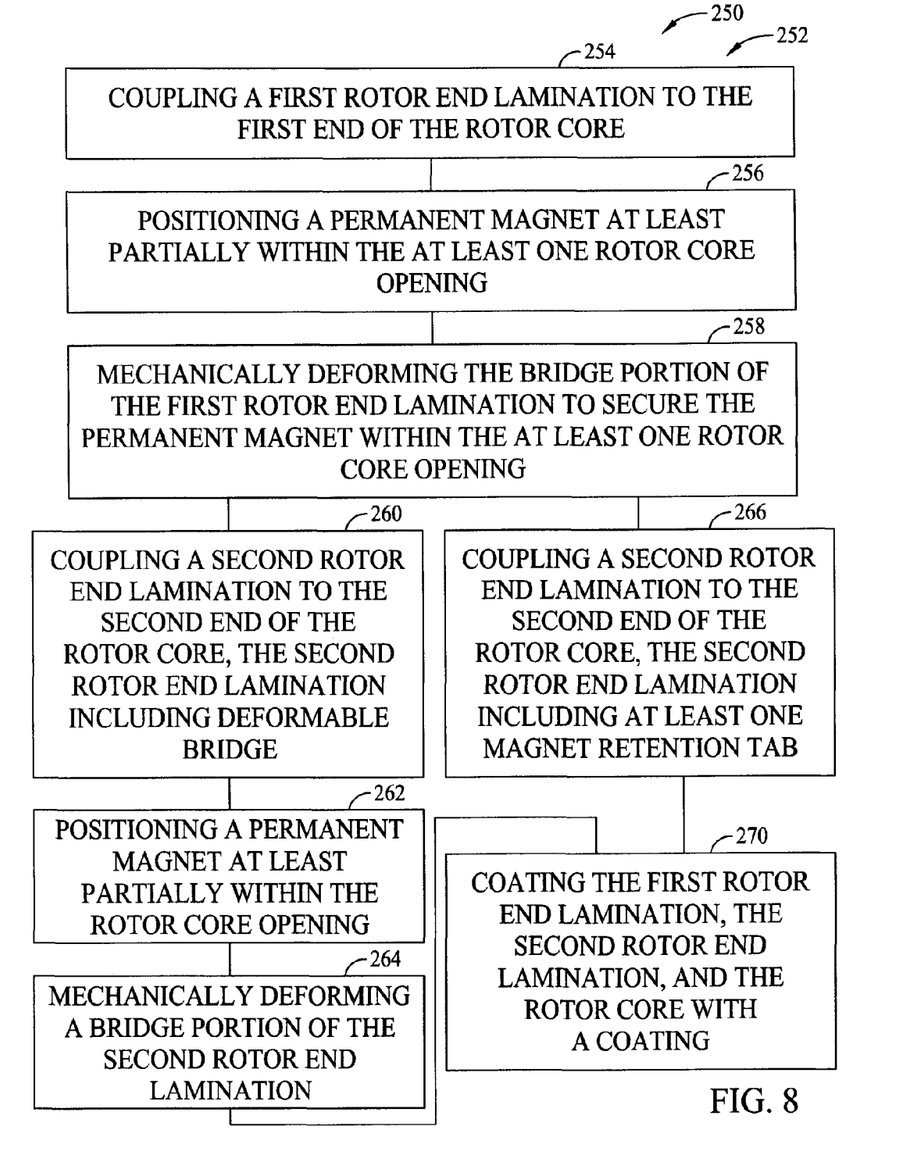
FIG. 8 is a flow chart of an exemplary method for assembling a permanent magnet rotor for an electric motor, for example, the electric motor shown in FIG. 1.

FIG. 8 is a flow chart 250 of an exemplary method 252 for assembling a permanent magnet rotor for an electric motor, for example, rotatable assembly 20 of electric motor 10 (shown in FIG. 1). As described above, the rotor core, for example, rotor core 36 (shown in FIG. 2), includes at least one opening configured to receive a permanent magnet, for example, permanent magnet opening 68 (shown in FIG. 3). Rotor core 36 includes first end 12 and second end 14. A permanent magnet, for example, permanent magnet 210 (shown in FIG. 6) is inserted into opening 68 and at least partially extends from first end 12 to second end 14. In the exemplary embodiment, method 252 includes coupling 254 a first rotor end lamination, for example, first rotor end lamination 100 (shown in FIG. 2), to first end 12 of rotor core 36. First rotor end lamination 100 includes at least one opening, for example, opening 130 (shown in FIG. 5) that corresponds to opening 68 in rotor core 36. First rotor end lamination 100 also includes a bridge portion, for example, bridge portion 186 (shown in FIG. 5), positioned between opening 130 and outer edge 190 of first rotor end lamination 100.

Coupling 254 first rotor end lamination 100 to first end 12 of rotor core 36 may include coupling first rotor end lamination 100 to at least one of a laminated rotor core and a solid rotor core. In an alternative embodiment, coupling 254 may include fabricating a laminated rotor core that includes a plurality of rotor core laminations and first rotor end lamination 100.

In the exemplary embodiment, method 252 also includes positioning 256 permanent magnet 210 at least partially within opening 68. Method 252 also includes mechanically deforming 258 bridge portion 186 to secure permanent magnet 210 within opening 68. In some embodiments, method 252 also includes coupling 260 a second rotor end lamination, for example, second rotor end lamination 110 (shown in FIG. 2) to second end 14 of rotor core 36. Second rotor end lamination 110 includes opening 130 that corresponds to opening 68 in rotor core 36. Second rotor end lamination 110 also includes bridge portion 186 positioned between first inner wall 122 of opening 130 and outer edge 190 of second rotor end lamination 110. Method 252 may also include positioning 262 permanent magnet 210 at least partially within opening 68 and mechanically deforming 264 bridge portion 186 of second rotor end lamination 110 to secure permanent magnet 210 within opening 68.

In an alternative embodiment, method 252 includes coupling 266 a second rotor end lamination, for example, second rotor end lamination 110 (shown in FIG. 2) to second end 14 of rotor core 36. Second rotor end lamination 110 includes at least one opening, for example, opening 130 (shown in FIG. 4) that corresponds to opening 68 in rotor core 36. In the alternative embodiment, second rotor end lamination 110 includes at least one magnet retention feature, for example, tab 156 and/or tab 158 (shown in FIG. 4), extending toward center 164 of opening 130 and configured to secure permanent magnet 210 within opening 68.

Method 252 may further include coating 270 first rotor end lamination 100, second rotor end lamination 110, and rotor core 36 with a coating to facilitate preventing corrosion. For example, coating 270 may include, but is not limited to, utilizing a paint and/or epoxy coating to dip, coat or electrostatically apply the coating to rotatable assembly 20. Coating 270 facilitates resisting corrosion and bonding the magnet into position within opening 68. Coating 270 may further include pre-heating first rotor end lamination 100, second rotor end lamination 110, and rotor core 36 prior to application of the coating to facilitate uniform coverage.

Described herein are exemplary rotatable assemblies for use in an electric machine and exemplary methods of assembling such assemblies. More specifically, the methods and apparatus described herein facilitate securing a permanent magnet within an interior permanent magnet rotor. The methods and apparatus described herein facilitate securing permanent magnets within a laminated rotor core or a solid rotor core without an additional manufacturing step of coupling end laminations to the rotor core after the permanent magnets are positioned within the rotor core. In an exemplary embodiment, a rotor core (interlocked or loose lamination) is manufactured to include a first end lamination that includes protruding tabs in magnet openings and a second end lamination that includes a mechanically deformable bridge. Alternatively, the first and the second end laminations may be coupled to the rotor core during assembly of the rotatable assembly. In an alternative embodiment, a first end lamination that includes a mechanically deformable bridge is included at a first end of the rotor core and a second end lamination that includes a mechanically deformable bridge is included at a second end of the rotor core. Permanent magnets are inserted into permanent magnet openings in the rotor core and the first and second mechanically deformable bridges are deformed to secure the permanent magnets within the openings. The rotatable assembly is then sent through a coating process to prevent movement of magnets within the permanent magnet openings and to minimize corrosion of the rotor core, the end laminations, and/or the permanent magnets.

Furthermore, the rotor core may include openings between the shaft opening and the permanent magnet openings that reduce mass, facilitate efficient pre-heating of the rotor core for a satisfactory coating process, and optimize a natural frequency of the rotor core.

The methods and apparatus described herein facilitate efficient and economical manufacture and operation of an interior permanent magnet electric machine. Exemplary embodiments of methods and apparatus are described and/or illustrated herein in detail. The methods and apparatus are not limited to the specific embodiments described herein, but rather, components of each apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A permanent magnet rotor comprising:
at least one permanent magnet;
a rotor core including a first end and a second end, said rotor core comprising a plurality of inner core walls that define a plurality of permanent magnet openings, each permanent magnet opening configured to receive said at least one permanent magnet; and
a first rotor end lamination coupled to the first end of said rotor core, said first rotor end lamination comprising an axially outermost member of said rotor and comprising a plurality of inner lamination walls defining a first opening and a second opening circumferentially adjacent the first opening, said first and second openings corresponding to the plurality of permanent magnet openings included within said rotor core, said first opening and said second opening being similarly configured, wherein at least one inner lamination wall defines at least a portion of at least one permanent magnet retention feature configured to secure said at least one permanent magnet within said rotor core,
wherein said at least one permanent magnet retention feature comprises a deformable bridge positioned between said radially outer inner lamination wall and an outer edge of said first rotor end lamination, wherein an entire length of said radially outer inner lamination wall is curved and said deformable bridge prevents said at least one permanent magnet from passing through one of said first and second openings to facilitate securing said at least one permanent magnet within a corresponding permanent magnet opening when mechanically deformed.

2. The rotor in accordance with claim 1 further comprising a shaft, said at least one permanent magnet positioned within said rotor core substantially parallel to said shaft and an axis of rotation of said rotor.

3. The rotor in accordance with claim 1 wherein said rotor core comprises at least one of a solid rotor core and a laminated rotor core.

4. The rotor in accordance with claim 1 further comprising a second rotor end lamination coupled to the second end of said rotor core and comprising a plurality of second inner lamination walls defining a first opening and a second opening circumferentially adjacent to the first opening, said first and second openings corresponding to the plurality of permanent magnet openings included within said rotor core, said first opening and said second opening being similarly configured, wherein at least one of the second inner lamination walls defines at least one permanent magnet retention feature configured to secure said at least one permanent magnet within said rotor core.

5. The rotor in accordance with claim 4 wherein said first rotor end lamination, said second rotor end lamination, and said rotor core are coated to facilitate preventing corrosion.

6. The rotor in accordance with claim 5 further comprising at least one rotor core opening extending through said first rotor end lamination, said second rotor end lamination, and said rotor core, said at least one rotor core opening configured to facilitate efficient pre-heating of said rotor core prior to coating and to optimize a natural frequency of said rotor core.

7. An electric machine comprising:
a machine housing;
a stator disposed at least partially within said machine housing; and
a rotor disposed at least partially within said machine housing, said rotor configured to rotate with respect to said stator, said rotor comprising:
at least one permanent magnet;
a rotor core including a first end, a second end, and a plurality of inner core walls defining a plurality of permanent magnet openings, each permanent magnet opening configured to receive said at least one permanent magnet; and
a first rotor end lamination coupled to the first end of said rotor core, said first rotor end lamination comprising an axially outermost member of said rotor and comprising a plurality of inner lamination walls defining a first opening and a circumferentially adjacent second opening, said first and second openings corresponding to the plurality of permanent magnet openings included within said rotor core, said first opening and said second opening being similarly configured, wherein at least one inner lamination wall defines at least a portion of at least one permanent magnet retention feature configured to secure said at least one permanent magnet within said rotor core,
wherein said at least one permanent magnet retention feature comprises a deformable bridge positioned between said radially outer inner lamination wall and an outer edge of said first rotor end lamination, wherein an entire length of said radially outer inner lamination wall is curved and said deformable bridge prevents said at least one permanent magnet from passing through one of said first and second openings to facilitate securing said at least one permanent magnet within a corresponding permanent magnet opening when mechanically deformed.

8. The electric machine in accordance with claim 7 further comprising:
a second rotor end lamination coupled to the second end of said rotor core and comprising a plurality of second inner lamination walls defining a first opening and a second opening circumferentially adjacent to the first opening, said first and second openings corresponding to the plurality of permanent magnet openings included within said rotor core, said first opening and said second opening being similarly configured, at least one of said plurality of second inner lamination walls defines at least one permanent magnet retention feature configured to secure said at least one permanent magnet within said rotor core; and
at least one rotor core opening extending through said first rotor end lamination, said second rotor end lamination, and said rotor core, said at least one rotor core opening configured to facilitate efficient pre-heating of said rotor core prior to coating and to optimize a natural frequency of said rotor core.

* * * * *